S. G. CRANE.
AUTOMATIC WEIGHING SCALE.
APPLICATION FILED JUNE 9, 1913.

1,221,143.

Patented Apr. 3, 1917.
3 SHEETS—SHEET 1.

S. G. CRANE.
AUTOMATIC WEIGHING SCALE.
APPLICATION FILED JUNE 9, 1913.

1,221,143.

Patented Apr. 3, 1917.
3 SHEETS—SHEET 2.

UNITED STATES PATENT OFFICE.

SAMUEL G. CRANE, OF TOLEDO, OHIO, ASSIGNOR TO TOLEDO COMPUTING SCALE COMPANY, OF NEWARK, NEW JERSEY, A CORPORATION OF NEW JERSEY.

AUTOMATIC WEIGHING-SCALE.

1,221,143.     Specification of Letters Patent.     Patented Apr. 3, 1917.

Application filed June 9 1913. Serial No. 772,574.

*To all whom it may concern:*

Be it known that I, SAMUEL G. CRANE, a citizen of the United States, residing at Toledo, in the county of Lucas and State of Ohio, have invented certain new and useful Improvements in Automatic Weighing-Scales, of which the following is a specification.

My invention relates more particularly to that class of automatic beam scales in which a poise is automatically adjusted longitudinally of the beam until the latter is in equilibrium, and in the embodiment hereinafter described includes in its construction a pair of solenoids which act upon a common armature or movable core to which the poise is attached whereby the latter is moved in one direction or the other according to which solenoid is in circuit. The construction also includes a computing chart or drum which is likewise controlled by the solenoids and indicates the weight and total values at various prices per unit of weight corresponding to different positions of the longitudinally movable or sliding poise. Other features of the invention will be referred to in the course of the following detailed description in which taken in connection with the accompanying drawings is disclosed a preferred form of my invention. It is to be understood, however, that the detailed disclosure is for the purpose of exemplifying the invention only and that the scope of the latter is set forth in the following claims in which I have endeavored to distinguish it from the prior art so far as known to me without, however, relinquishing or abandoning any part thereof.

Figure 1:
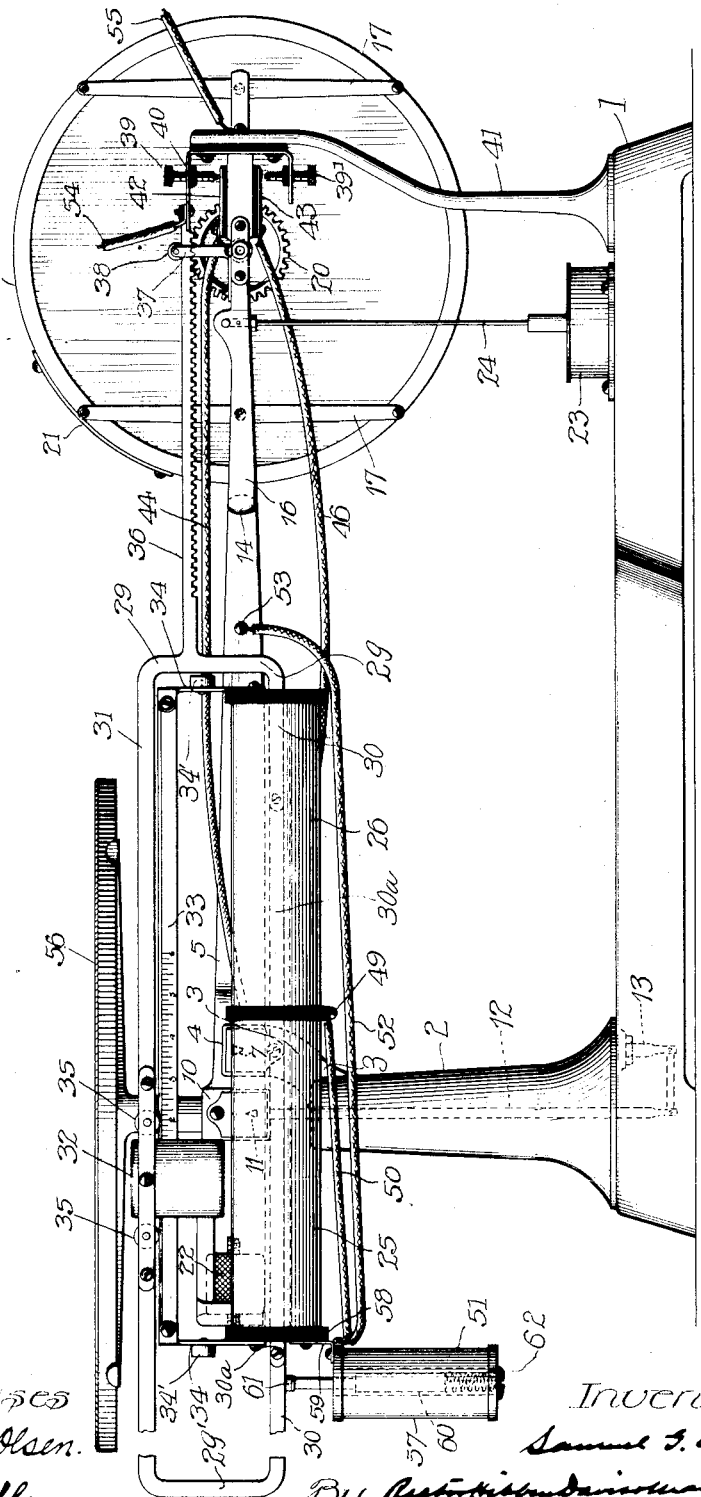
Figure 2:
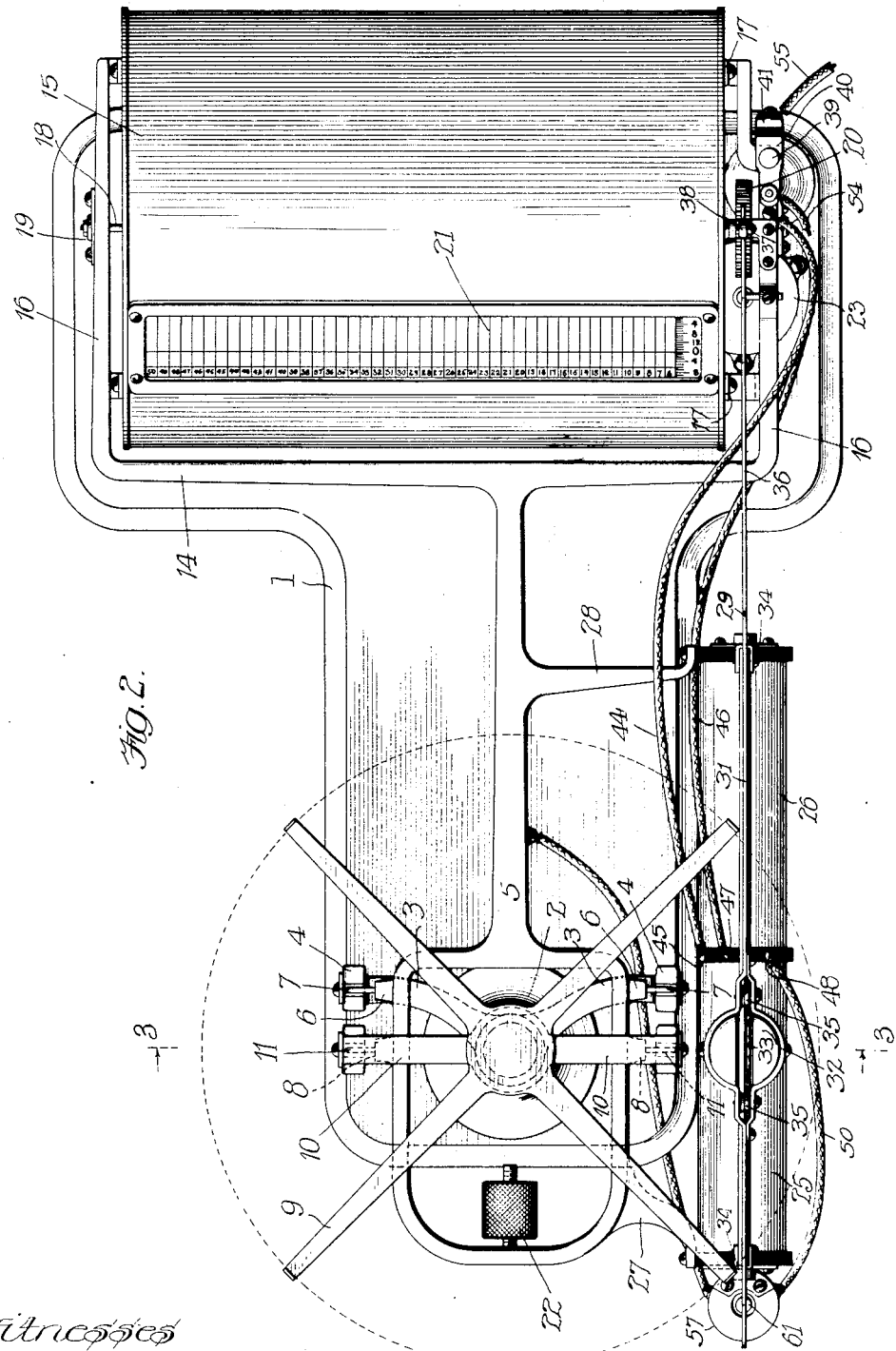
Figure 3:
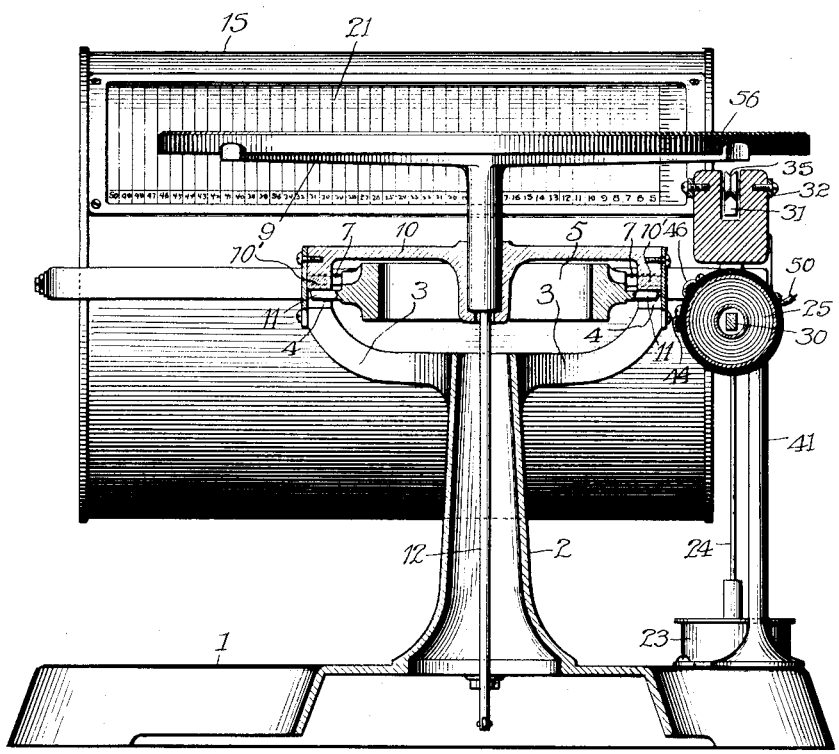

In the accompanying drawings Figure 1 is a side elevation of my improved scale; Fig. 2 a plan view thereof and Fig. 3 a transverse section through the line 3—3 of Fig. 2.

The base 1 of the scale may be of any suitable or preferred form and has mounted thereon at one end the pillar 2 having the branching arms 3, 3 which carry the bearings 4, 4 constituting the fulcrum for the beam 5 of the scale. The latter takes the form of an open casting of somewhat irregular shape as best shown in Fig. 2 of the drawing and is formed with lugs 6, 6 carrying the knife edges 7, 7 which rest upon the bearing blocks referred to above. The beam is also provided at 8, 8 with bosses carrying upwardly directed knives 11, 11 upon which is supported the spider 9 for receiving the pan or platform and which is formed with or, as shown, secured to oppositely extending arms 10, 10 which are downwardly turned at their ends and receive agate or other bearing blocks 10', 10' which rest upon the knives 11, 11 upon the scale beam. The pillar 2, referred to above, is hollow and open at its ends to permit the extension therethrough of a check rod 12 rigidly connected to the spider and linked to a stationary post 13 beneath the base for the usual purpose of maintaining the spider in horizontal position.

At its rear end the beam is forked to form a rectangular frame 14 within which a cylindrical chart casing 15 is mounted. The ends of the chart casing are connected to the branches 16, 16 of the scale beam by vertical straps 17, 17 to secure the same firmly in position on the beam. A drum or cylinder chart of any usual or preferred form is inclosed within the casing but journaled by means of its shaft 18 in the branches 16, 16 of the beam, suitable anti-friction bearings 19, 19 being provided for this purpose. Upon one end of the shaft is rigidly mounted a pinion 20 by which the chart is revolved and the casing is provided with a sight opening 21 arranged at a convenient angle for the observation of the person operating the scale. At 22 is shown a common form of sealing weight and a dashpot 23 is mounted upon the base, its piston being connected by a rod 24 with the beam, as shown in Fig. 1, to prevent undue vibration thereof.

As above stated the means for automatically offsetting the load placed upon the scale pan comprises a weight or poise and a pair of solenoids for reciprocating the same. The solenoids 25, 26 are shown as inclosed in casings arranged end to end longitudinally of the scale and supported together by brackets 27, 28 integral with the scale beam. The movable frame 29 is supported by rollers 35, 35 upon a graduated track or guide 33, which latter is embraced by the sliding poise 32 carried by the frame. The latter comprises end pieces 29', 29' which are formed integral with inwardly extending members 30' which form the cores of the solenoids 25, 26 respectively. The ends of said cores are connected for rigidity by a bar or bars of non-magnetic material 30ª (see Fig. 1). It will thus be seen that when either coil is energized with the other coil unenergized it attracts its armature and correspondingly shifts the frame and poise. The guide 33 is supported on brackets 34, 34 rising from opposite ends of a pair of solenoids and provided with suitable bumpers 34', 34' to limit the movement of the frame 31. At its rear end the frame is extended into a rack bar 36 which is maintained in mesh with the pinion 20 on the drum heretofore referred to by a guide 37 and antifriction roll 38. Obviously movement of the frame carrying the poise is accompanied and indicated by a corresponding revolution of the computing drum.

The connections for energizing the solenoid coils comprise a pair of adjustable contact screws 39, 39' mounted respectively above and below one of the branches 16 of the beam on a sheet metal bracket 40 secured to but insulated from a standard 41 rising from the base. The contact screws 39, 39' are adapted to engage contact plates 42, 43 respectively upon the upper and under side of the beam but insulated therefrom, and from the upper plate 42 an insulated wire 44 leads to an attaching screw 45 on insulating disk 48 which is in electrical connection with the coil 25. From the under contact plate 43 an insulated wire 46 leads to an attaching screw 47 also upon the insulating division plate 48 by which the coils are separated, which screw is in electrical connection with the coil of solenoid 26. Coils 25 and 26 are both connected by an insulated wire 50 with a brake coil 51 to be presently described, from which connecting wire 52 leads to the beam at 53 where it is grounded. The service wires 54, 55 are connected to the bracket 40 and standard 41 respectively.

Normally the scale beam occupies a position about midway between the contact screws 39, 39' and out of contact with either so that there is no current flowing through the device. If, however, a load or article to be weighed is placed upon the platform 56 carried by the spider the longer arm of the beam is raised thereby to make contact with the screw 39. A circuit is thus closed from the service wire 54 through the bracket 40, contact screw 39, contact plate 42, wire 44, screw 45, coil 25, wire 50, coil 51, wire 52 and the beam and frame of the scale back to service at 55. The solenoid coil being thus energized will attract its core or armature and therefore move the frame and poise to the right as seen in Fig. 1 until equilibrium is restored when the circuit will be broken by the contact plate 42 leaving the contact screw 39. The movement of the frame as before stated revolves the computing chart to indicate the weight and values at different prices per unit of weight. If, however, by reason of the momentum of the parts the frame and poise are carried too far the beam will swing down to make contact between the contact screw 39' and the contact plate 43. A circuit is then closed from the service wire 54 through bracket 40, contact screw 39', contact plate 43, wire 46, solenoid coil 26, wire 50, coil 51, wire 52, the beam and frame of the scale and standard 41 back to service at 55. The solenoid coil 26 will thereupon attract its armature and cause a movement of the frame carrying the poise in a reverse direction and as the movement will naturally be markedly less than the first movement of the frame and poise the tendency to overthrow will be correspondingly small.

But in order to substantially eliminate over-throw I have provided the electric brake 51 referred to above. This comprises a casing 57 attached to the insulating end plate 58 of solenoid 25 by a bracket 59 and inclosing not only the coil 51 referred to above, but also a movable core 60 carrying a brake shoe 61 which is normally urged upward to bring the brake shoe in contact with the frame 30 by a spring 62 beneath the same. Whenever a circuit is closed through the brake coil by either beam contact touching its stationary contact and whichever solenoid coil is included in the circuit, the brake solenoid attracts its armature removing the brake 61 from the shiftable frame 31 so that the latter is free to move under the influence of whichever solenoid is in circuit. Whenever the beam moves, however, and the circuit is thereby broken, the brake solenoid releases its core and the brake 61 is again operative upon the sliding frame carrying the poise. Thus the brake is applied immediately upon the movement of the beam toward the position of equilibrium and overthrow of the poise is prevented.

Obviously after an article has been weighed and upon its removal from the scale the poise will be automatically returned to the zero position for the long arm of the scale beam will be lowered to close the circuit through the coil 26.

I claim:

1. In a scale of the class described, a beam, a poise mounted for adjustment longitudinally of the beam, a solenoid, a switch in circuit therewith, the movable member of which is closed by the movement of the beam and a core for the solenoid connected to the poise.

2. In a weighing scale and in combination with the beam thereof, a poise adjustable longitudinally of the beam, a pair of solenoids, cores for the solenoids connected to the poise for operating the same, a pair of switches one of which controls the circuit through one coil and the other of which controls the circuit through the other coil, the movable members of the switches being controlled by the movement of the beam.

3. In a weighing scale and in combination with the beam thereof, a poise movable longitudinally of the beam, a pair of solenoids mounted on the beam, cores for said solenoids connected to the poise for operating the same, a pair of relatively stationary contacts, a pair of contact plates carried by the beam and arranged to engage the respective stationary contacts, connections from the contact strips on the beam to the respective coils and connections for completing the circuits.

4. In a weighing scale and in combination with the beam thereof, a poise adapted for adjustment longitudinally of the beam, a solenoid carried by the beam, a solenoid core therefor connected to the poise to operate the same, a stationary contact, a contact carried by the beam and adapted to engage with said stationary contact, connections from the contact on the beam to the solenoid and connections for completing a circuit through a source of electrical energy.

5. In a weighing scale and in combination with the beam thereof, a frame movable longitudinally of the beam, a poise connected to and carried by the frame, a solenoid coil through which one arm of the frame extends constituting a movable core therefor, a stationary contact, a contact mounted on the beam to engage the same and connections from said contacts including the solenoid coil and a source of electrical energy.

6. In a weighing scale and in combination with the beam thereof, a poise adjustable longitudinally of the beam, a pair of solenoids arranged in axial alinement, a core common to the solenoids and connected to the poise, a pair of switches adapted and arranged to be closed by the movement of the beam in opposite directions and connections from the switches to a source of current and to the respective coils whereby the poise may be automatically adjusted to bring the scale into equilibrium.

7. In a weighing scale and in combination with the beam thereof, a poise adjustable longitudinally of the beam, a pair of solenoid coils, the cores of which are connected to the poise and which are adapted to shift the poise respectively in opposite directions, stationary contacts arranged above and below the beam, a contact mounted upon and movable with the beam connected to one of the solenoid coils and adapted to close the circuit therethrough to move the poise in one direction and a second contact plate on the beam adapted to engage the other stationary contact to close a circuit through the other coil to move the poise in the opposite direction.

8. In a weighing scale and in combination with the beam thereof, a poise adjustable longitudinally of the beam, a frame adapted to shift the poise, a pair of solenoid coils axially alined and having a common core forming a part of said frame and a pair of switches adapted to be closed by the movement of the beam in opposite directions to close circuits through the respective coils to reciprocate the poise.

9. In a weighing scale and in combination with the beam thereof, a rotary indicator, a pinion on the axis thereof, a poise shiftable longitudinally of the beam, a rack connected to the poise and engaging the pinion, and electrical means including a solenoid for automatically shifting the poise and controlled in its operation by the position of the beam.

10. In a weighing scale and in combination with the beam thereof, a rotary chart, a pinion connected thereto, a longitudinally movable poise, a rack connected to the poise and engaging the pinion, a solenoid having a core also connected to the poise, and a circuit for connecting the solenoid with a source of electrical energy including a switch operated by the movement of the beam for closing the circuit through the solenoid.

11. In a weighing scale and in combination with the beam thereof, a poise adjustable longitudinally of the beam, a rotary chart mounted on the beam, connections between the poise and the rotary chart for operating the same, a pair of solenoids, the cores whereof are connected to the poise and which are adapted to shift the latter in opposite directions respectively, circuits arranged to connect the respective solenoids with a source of electrical energy and including a pair of switches adapted to be closed by the movements of the beam to close the circuits through the respective solenoid coils.

12. In a weighing scale and in combination with the beam thereof, a poise movable longitudinally of the beam, a frame by which said poise is moved, a brake operating upon the frame and electro-magnetic means for withdrawing the brake from contact with the frame.

13. In a weighing scale and in combination with the beam thereof, a poise adjustable longitudinally of the beam, a reciprocating frame for operating the poise, a brake normally forced into contact with the frame, electro-magnetic means for withdrawing the brake from the frame and a switch for closing the circuit through the electro-magnetic means, the movable member of which switch is operated by the beam.

14. In a weighing scale and in combination with the beam thereof, a poise adjustable longitudinally of the beam, a frame for adjusting the poise, a brake normally pressed into contact with the frame, a solenoid coil for withdrawing the brake and a switch for closing circuit through the solenoid coil one member of which is stationary and the other carried by the beam.

15. In a weighing scale and in combination with the beam thereof, a poise movable longitudinally of the beam, a longitudinally movable frame, electro-magnetic means for moving the poise, a brake normally engaging said frame and resisting movement of the poise, electro-magnetic means for withdrawing the brake and switches operated by the movement of the beam for closing circuits through the electro-magnetic weight-shifting and brake-operating means.

16. In a weighing scale and in combination with the beam thereof, a poise adjustable longitudinally of the beam, a frame carrying the poise, electro-magnetic means for moving the frame, a brake normally operating to check the movement of the frame, electro-magnetic means in circuit with the first said electro-magnetic means for withdrawing the brake and a switch operated by the movement of the beam for closing the circuit through said electro-magnetic means.

17. In a weighing scale and in combination with the beam thereof, a poise adjustable longitudinally of the beam, a frame carrying the poise, a pair of electro-magnetic means for moving the frame in opposite directions, a brake adapted to engage the frame for checking the movement thereof, electro-magnetic means in circuit with both said poise-shifting means for withdrawing the brake, and switches closed by the opposite movement of the beam for closing circuits through the respective poise-shifting means respectively and through the brake-operating means.

18. In a weighing scale and in combination with the beam thereof, a poise adapted to be shifted longitudinally of the beam, a pair of solenoids having cores connected to the poise for moving the same in opposite directions respectively, a pair of switches in circuit with the respective solenoids and operated by movements of the beam to close circuits through the same, a brake and electro-magnetically operated means for moving the same in circuit with said solenoids.

19. In a weighing scale and in combination with the beam thereof, a frame 29 carrying a poise and one branch of which forms the core of a pair of axially arranged solenoids, said solenoids 25, 26, stationary contacts 39, 39', movable contact plates 42, 43 mounted upon the beam and connected respectively to the coil of solenoid 26 and to the coil of solenoid 25, a brake 61, a solenoid 51 controlling the brake, a common connection from the solenoids 25 and 26 to solenoid 51 and connections to a source of current whereby the solenoid of the brake will be energized whenever either of the other two solenoids is energized.

SAMUEL G. CRANE.

Witnesses:
CLARENCE W. FESSENDEN,
CLARENCE H. HAPGOOD.

Copies of this patent may be obtained for five cents each, by addressing the "Commissioner of Patents, Washington, D. C."